Jan. 28, 1969        C. KEMPER         3,424,212
                  SCREW WRENCH DEVICE
Filed April 12, 1967                Sheet 1 of 2
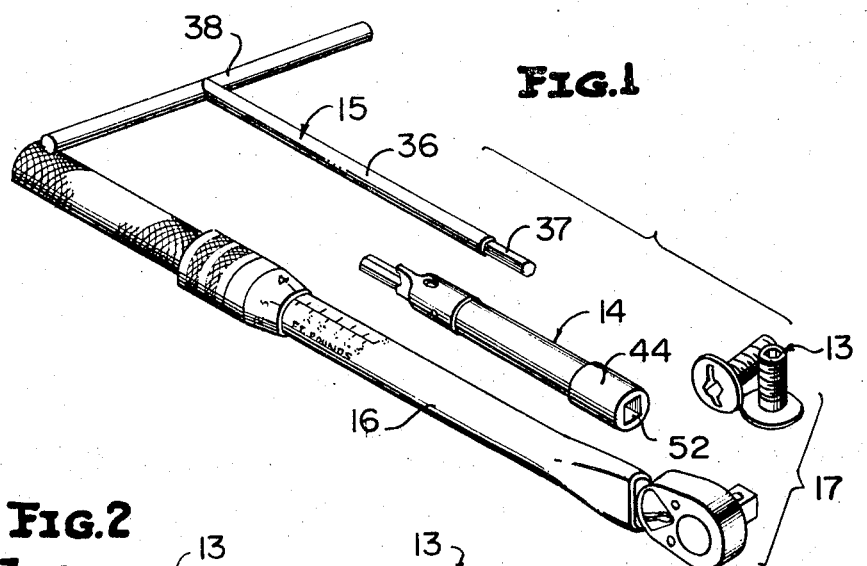
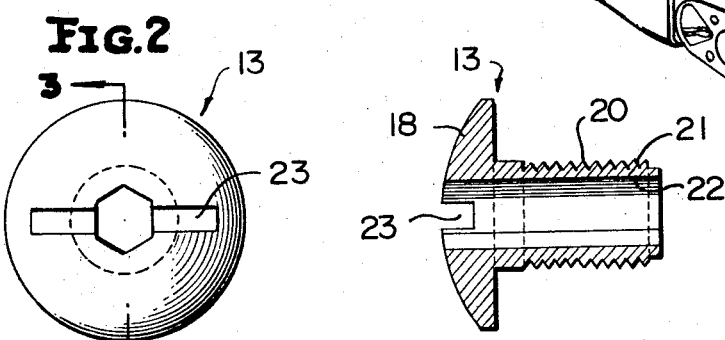
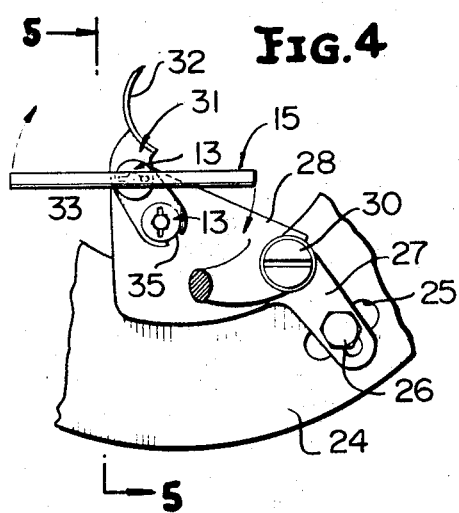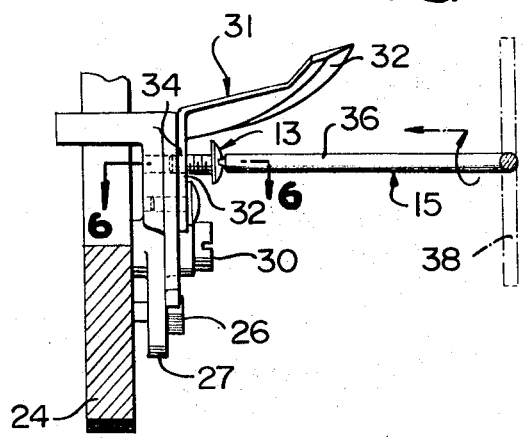
INVENTOR
CLYDE KEMPER
BY Mason, Porter, Diller & Brown
ATTORNEYS Jan. 28, 1969   C. KEMPER   3,424,212
SCREW WRENCH DEVICE
Filed April 12, 1967   Sheet 2 of 2
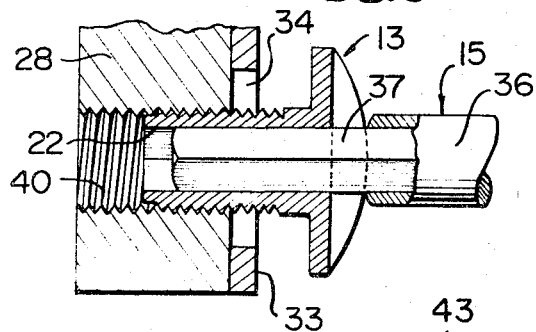
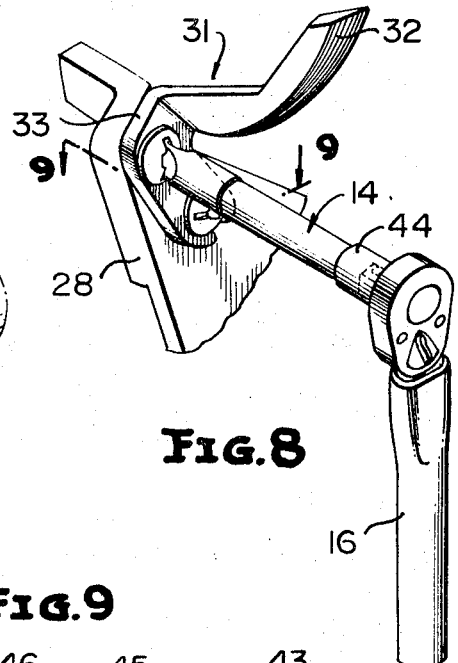
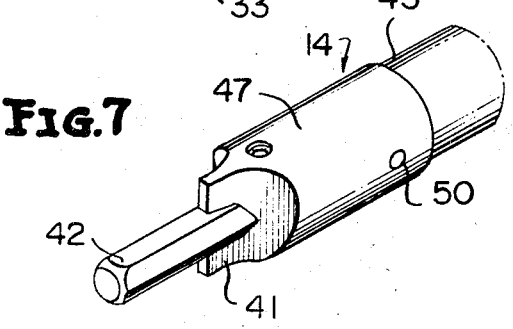
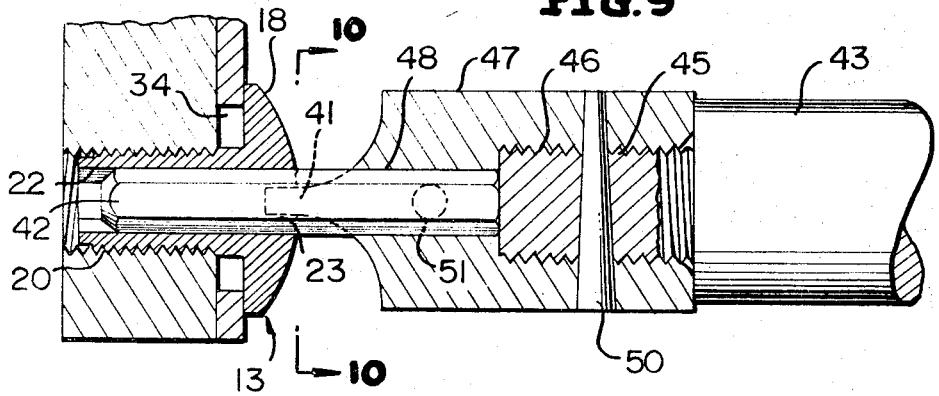
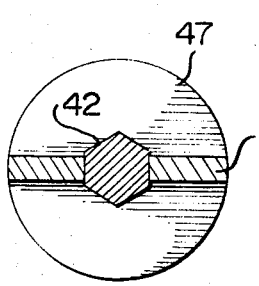
INVENTOR
CLYDE KEMPER
ATTORNEYS United States Patent Office 3,424,212
Patented Jan. 28, 1969

3,424,212
SCREW WRENCH DEVICE
Clyde Kemper, Westminster, Md., assignor to The United Company, Westminster, Md., a corporation of Maryland
Filed Apr. 12, 1967, Ser. No. 630,287
U.S. Cl. 145—50                     10 Claims
Int. Cl. B25b 15/00, 13/48; F16b 23/00

ABSTRACT OF THE DISCLOSURE

Screw driving devices particularly adapted for employment with screws located proximate additional machine elements. The screw and driving devices include a shank portion, a grip portion, and a compound drive member including a driving blade and multiple-sided driving member. The blade and multiple-sided member are provided for mating with corresponding screw slots and bores, respectively.

---

This application relates in general to new and useful improvements in screw driving devices, and more particularly to screw wrenches particularly adapted to maintain a positive grip on a driven element at a driving end of the screw wrench while the grip end of the screw wrench is being driven at a point spaced substantially from the driving portion of the screw wrench.

In driving screw-type elements into various parts of machines, it is often difficult to turn the screw with a conventional type of hand-operated driving tool, because of the presence of other machine components which inhibit the placement of a mechanic's hand in a proximity close enough to the screw to develop sufficient driving torque for turning the screw.

More particularly, in cutting machines of the type disclosed in United States Patent No. 2,141,346, cutting blades are secured to mounting surfaces by means of cap screws. The blades are often provided with enlarged mounting holes, through which shanks of the cap screws or other suitable fasteners extend, in order to facilitate adjustment of the blades. Should it be necessary to frequently adjust the blades, it is necessary for a mechanic to frequently remove and replace the cap screws which mount the blades. It often, therefore, becomes necessary for the mechanic to engage a driving tool for turning the cap screws, and thereby placing his hand in the general vicinity of the cutting edges of the blade, a procedure which may be physically dangerous to the mechanic.

The present invention seeks to obviate the disadvantages of utilizing prior art types of fasteners and driving elements therefore, which require the placement of the hand of a mechanic in the vicinity of dangerous machine instruments, such as cutting blades. It has thus been found desirable to utilize a driving tool, the shank of which is of sufficient length to be gripped at a point safely removed from the vicinity of the cutting blades, and which is adapted to securely engage the screw-type fasteners utilized to mount the blades.

It has further been found desirable to utilize a driving tool having an elongated shank, which may be gripped either manually or by another mechanical instrument, and which has a compound driving means for turning the screw. The particular compound driving means of the present invention utilizes a socket type driving means having multiple driving surfaces in combination with a conventional blade type driving means, thereby combining the desirable features of both. The socket type driving means eliminates the disadvantages of the simple blade type driving means, such as slip-off when high driving torques are applied to the fasteners. The blade type driving means is capable of transmitting driving torque from a greater radial distance, and is thus adapted to provide a greater lever advantage than most driving devices of the socket type. By combining these two types of driving means in a single driving tool, the advantages of both types of driving means are best utilized, and the disadvantages are minimized. A further advantage of the compound driving means for the screw wrench of this invention resides in the fact that both driving means facilitate the proper alignment of the driving wrench on a fastener.

Accordingly, it is a primary object of this invention to provide a screw wrench which is adapted to engage screw-type fasteners which are located closely adjacent machine cutting elements, wherein the cutting elements have blade portions which extend lengthwise of the screw wrench when the screw wrench is positioned for turning a fastener, and wherein the screw wrench is of a length sufficient when engaged with a fastener to facilitate gripping of the wrench either manually or by another instrument, in safely spaced relation from other machine elements such as cutting blades.

It is another object of this invention to provide a screw wrench comprising a shank having a driving portion at one end thereof and a grip portion at another end, wherein the driving portion includes a compound driving member for engaging and turning fasteners.

It is a further object of this invention to provide a driving tool adapted for turning screw-type fasteners, wherein the tool has a compound drive member including multiple driving surfaces for engaging corresponding multiple surfaces in a socket of a driven member, including conventional blade type driving means for insertion into a corresponding slot in the head of a driven member.

It is a further object of this invention to provide a screw wrench having a compound driving means at an end thereof for engaging and turning fasteners of the screw type, wherein the compound driving means includes a multiple sided driving portion for engaging in a corresponding socket extending longitudinally of a screw member and a blade portion for engaging a corresponding slot in the head of a screw member, wherein ends of the multiple sided drive means and the blade means are spaced longitudinally of the tool and are separably interconnected.

With the above and other objects in view that will hereinafter appear, the nature of the invention will be more clearly understood by reference to the following detailed description, the appended claims and the several view illustrated in the accompanying drawings.

In the drawings:

FIGURE 1 is a top perspective view of screw-type fastening elements and driving tools therefor of this invention.

FIGURE 2 is an enlarged view of a screw head embodying the compound drive means of this invention.

FIGURE 3 is an enlarged sectional view of the screw illustrated in FIGURE 2, taken along the line 3—3 of FIGURE 2, further illustrating the compound driving means for the screw of this invention.

FIGURE 4 is a fragmentary end view of a portion of a corn cutting machine having a cutting element mounted thereon by means of screws of the type disclosed herein, wherein the cutting element has a blade portion extending lengthwise of the shank of the driving tool, and wherein the driving tool is of the type having multiple driving surfaces for engaging a mating socket on the screw member.

FIGURE 5 is a fragmentary elevational view of that portion of the cutting machine illustrated in FIGURE 4, taken along the line 5—5 of FIGURE 4, and wherein the spacing of the grip or handle portion of the screw wrench from the end of the blade of the cutting element is best illustrated.

FIGURE 6 is an enlarged fragmentary sectional view

3 taken along the line 6—6 of FIGURE 5, and wherein there is illustrated the engagement of a driving portion of the screw wrench into a corresponding socket in the screw member.

FIGURE 7 is an enlarged fragmentary top perspective view of the wrench or tool of this invention, wherein there is illustrated the compound driving portion of the tool, with the blade end driving portion being spaced longitudinally from the end of the multiple surface portion adapted for engaging a socket of the driven member.

FIGURE 8 is a top perspective view of a portion of a cutting machine of this invention, wherein there is illustrated a cutting blade of this invention extending longitudinally of the shank of the screw wrench of FIGURE 7, wherein the driving portion of the screw wrench is inserted into corresponding voids in a fastener, and wherein a ratchet type wrench is illustrated in engagement at a grip portion of the screw wrench, spaced longitudinally from an end of the cutting blade.

FIGURE 9 is an enlarged fragmentary sectional view of the screw wrench, screw-type fastener, cutting element and mounting plate of this invention, taken along the line 9—9 of FIGURE 8, and wherein the operative engagement of the screw wrench and fastener of this invention is best illustrated.

FIGURE 10 is an enlarged sectional view of the screw wrench of this invention taken along the line 10—10 of FIGURE 9, and wherein the connection of the hex-type driving means and blade-type driving means of the compound driving tool of this invention is best illustrated.

Referring now to the drawings in detail, reference is first made to FIGURE 1, wherein there is illustrated a combination of screw-type fasteners 13, a screw wrench 14, a screw wrench 15 and a ratchet wrench means 16. This grouping of elements 13 through 16 is generally designated by the numeral 17, and may be packaged together in kit form for modifying existing cutting machines.

With particular reference to FIGURES 2 and 3, there is illustrated a screw 13 having a head portion 18 and a shank portion 20. The shank portion 20 has conventional screw threads 21 on the outer surface thereof. A hole 22 of hex or six-sided cross-sectional configuration extends throughout the length of the head 18 and shank 20 of the screw 13. The hole 22 may be formed by a broaching or other similar operation. The head 18 of the screw 13 also has a blade slot 23 cut across the top thereof, across opposite flaps of the hex-shaped broached hole 22.

In FIGURES 4 and 5 there is illustrated a head plate 24 having a slotted hole 25 therein adapted to receive a mounting bolt 26 for securing an extension 27 of a lever arm 28 thereto. A pivot stud 30 is provided to facilitate pivotting of the lever arm 28. The lever arm 28 forms a mounting plate for a cutting element 31.

The cutting element 31 includes a blade portion 32 and a shank portion 33. The shank portion 33 has a hole 34 therein adapted to receive a screw-type fastener 13 therethrough, and a slotted hole 35 also adapted to receive a screw-type fastener 13 therethrough, for attachment to the pivot arm 28. The hole 34 and the slotted hole 35 in the shank 33 of the cutting element 31 are both of sufficiently large diameter to leave a wide clearance for the shank 20 of fasteners 13 therethrough, in order to facilitate adjusting the position of the cutting element 31, as desired.

A screw wrench 15 of the bar type, having a shank portion 36, a hex-type driving portion 37 and a cross-bar 38 type of grip portion is illustrated in engagement with the socket or hole 22 of a screw-type fastener 13 in FIGURE 4.

With particular reference to FIGURE 5, it is to be noted that the shank 36 of the screw wrench 15 is of sufficiently greater length than the blade portion 32 of the cutting cutting element 31, thus placing the grip portion

4

38 of the screw wrench 15 in a position safely remote from the sharp blade portion 32 of the cutting element 31, yet facilitating the driving of the fastener 13 by engagement of the hex driving portion 37 of the wrench 15 within the socket 22 of the screw 13.

In FIGURE 6 there is better illustrated the manner in which the hex driving portion 37 of the wrench 15 engages within the corresponding hex socket 22 of the screw 13, thereby facilitating the fastening of the shank 33 of the cutting element 31 to the lever arm 28, by engagement of the screw threads 21 with corresponding threads 40 tapped in the lever arm 28. There is also best illustrated in FIGURE 6, the relatively large diameter hole 34 provided in the shank 33 of the cutting element 31 for receiving the relatively small diameter shank 20 of the screw 13 therethrough, for facilitating adjustment of the cutting element 31.

In FIGURE 7 the screw wrench 14 having a compound driving portion comprising a blade portion 41 and a removable portion 42 is best illustrated. Additionally, the screw wrench 14 includes a shank portion 43 and a grip portion 44. The shank portion 43 of the wrench or tool 14 has a threaded stud 45 extending longitudinally thereof, in threaded engagement with a tapped bore 46 of a sleeve-like member 47. The sleeve-like member 47 terminates in the blade portion 41 and has a socket 48 extending therethrough in communication with the tapped bore 46. The sleeve-like member 47 is fixedly secured to the stud 45 of the shank 43 by a rivet 50, to prevent relative rotation between the member 47 and the stud 45. The hex driving member 42 is secured within the hex socket 48 of the sleeve-like member 47, by means of a set screw 51, generally of the "Allen" type. The terminal ends of the blade portion 41 and the hex driving portion 42 are thus spaced longitudinally, whereby the hex driving portion 42 may be inserted into the hex socket 22 of the screw 13, and the blade portion 41 may be inserted into the slot 23 of the head 18 of the screw 13, whereby upon rotation of the shank 43 of the screw wrench 14, driving torque will be transmitted through both the hex driving portion 42 and the blade driving portion 41 of the screw 13.

The grip portion 44 of the screw wrench or tool 14 is provided with a socket 52 of generally rectangular cross-sectional configuration, and is adapted to receive therein a corresponding driving member of rectangular cross-section such as that protruding from a ratchet-type torque wrench 16. The grip portion 44 of the screw wrench 14 is also spaced longitudinally from the blade 32 of the cutting element 31 a sufficient distance to facilitate driving of the screw wrench 14 without interference with the blade 32.

It is to be understood that the hex-shaped driving means 42 of the screw wrench 14, as well as the hex-shaped driving means 37 of the wrench 15 may be replaced by other multiple-surfaced driving means, as for example those of generally rectangular configuration, within the scope of this invention.

Also, it is to be noted that the slot 23 in the head 18 of the screw 13 is cut to a conventional size, adapted to receive ordinary blade types of screw drivers therein, such that should it become necessary to remove a screw-type fastener 13 from the threaded hole 40, by means of a conventional screw driver, such would be possible, although this procedure would not necessarily encompass the safeguards set forth herein.

Because the screw 13 is provided with the hole 22, the shank portion 20 of the screw 13 is of rather thin-walled construction. Thus, in the tightening of the screw 13 against the cutting element 31 it is often desirable to utilize a torque wrench, such as the wrench means 16 illustrated in FIGURE 1. This enables an operator to tighten the screw as much as possible with sufficient control over the applied torque to be consistent with the amount of torque the thin-walled screw shank portion 20 can withstand.

From the foregoing, it will be seen that novel and advantageous provisions have been made for carrying out the desired end. However, attention is again directed to the fact that additional variations may be made in this invention without departing from the spirit and scope thereof as defined in the appended claims.

I claim:
1. A tool having a driving portion, a shank portion and a grip portion and being adapted for engaging a fastener for a cutting element which has a blade portion normally extending lengthwise of and adjacent the tool shank portion when the tool is disposed for removing a fastener from the cutting element, the tool shank portion being of a length to dispose the tool grip portion in substantially spaced relation to the blade portion of the cutting element, said driving portion including multiple-sided surface means for insertion into a mating socket of a driven member and blade means for insertion into a mating slot of the driven member, said multiple-sided drive surface means defining means for preventing slippage of the tool in the area of the cutting element.

2. The tool of claim 1 wherein said grip means includes a manually engageable bar well removed from said driving portion and providing means for the manual application of torque to the tool at a position removed from the cutting element.

3. A tool adapted for engaging fasteners, said tool comprising a driving portion, a shank portion and a grip portion; the tool driving portion including a compound drive member for turning a fastener including multiple-sided driven surface means for insertion into a mating socket of a drive member and blade means intersecting said multiple-sided drive surface means for insertion into a mating slot of a driven member.

4. A tool of claim 3 wherein the grip portion includes a multiple-sided socket engagement means for receiving a driving member therein.

5. The tool of claim 4 in combination with a ratchet-type driving member of the torque wrench type for controlling the amount of torque applied to a thin-walled fastener.

6. The tool of claim 4 wherein the driving member is adapted to be hand operated.

7. The tool of claim 3 wherein the multiple-sided drive surface means and the blade means are spaced longitudinally of the tool driving portion, for insertion of the drive surface means substantially throughout the length of the driven member.

8. The tool of claim 3 wherein the multiple-sided drive surface means and the blade means are separable.

9. The tool of claim 8 wherein said drive surface means comprises a member having a blade portion formed integrally at one end thereof, said blade member defining an axially extending multiple-sided hole extending centrally through said blade portion, said multiple-sided drive surface means conforming to said hole and maintained partially therein, and means cooperating with said hole for maintaining said multiple-sided drive surface means secured partially within said hole.

10. The tool of claim 3 wherein the multiple-sided drive surface means is of hex-cross-sectional configuration, and the blade means are blade portions disposed on opposite sides of the hex configuration.

References Cited

UNITED STATES PATENTS

| | | | |
|---|---|---|---|
| 1,389,997 | 9/1921 | Sedgwick | 81—71 |
| 2,457,451 | 12/1948 | Domack | 81—71 |
| 2,705,030 | 3/1955 | Koffler et al. | 145—50.1 |
| 3,272,036 | 9/1966 | Van Hoose | 81—52.4 |

FOREIGN PATENTS 671,087  4/1952  Great Britain.

ROBERT C. RIORDON, *Primary Examiner.*

R. V. PARKER, *Assistant Examiner.*

U.S. Cl. X.R.

81—177, 71; 85—45